United States Patent [19]
Aleksoff

[11] 3,824,488
[45] July 16, 1974

[54] MODE SELECTIVE LASER LINE-SCANNER
[75] Inventor: Carl C. Aleksoff, Ann Arbor, Mich.
[73] Assignee: E. I. du Pont de Nemours & Company, Wilmington, Del.
[22] Filed: Apr. 18, 1973
[21] Appl. No.: 352,473

[52] U.S. Cl. .................. 331/94.5 K, 331/94.5 C
[51] Int. Cl. ............................................. H01s 3/00
[58] Field of Search...... 331/94.5 C, 94.5 D, 94.5 K

[56] References Cited
UNITED STATES PATENTS
3,440,560  4/1969  Pole .............................. 331/94.5 K
3,450,460  6/1969  Brown ............................... 350/150
3,473,864  10/1969  Garfany ......................... 350/160 R
3,720,784  3/1973  Maydon ........................ 331/94.5 C Primary Examiner—Edward S. Bauer

[57] ABSTRACT

A crystal of a material having ferroelastic properties and having a face "bent" to a concave rooftop shape by intersection of a domain wall is provided with a reflecting coating on the "bent" face. The rooftop mirror is employed off-axis in an optical resonant cavity containing a superradiant medium to form a laser. An image of coherent light can be extracted from the cavity which moves as the domain wall is moved.

4 Claims, 6 Drawing Figures

MODE SELECTIVE LASER LINE-SCANNER

BACKGROUND OF THE INVENTION

This invention relates to optical line scanners. More particularly this invention relates to lasers having a mode-selected scannable output.

A crystal is said to be ferroelectric if it exhibits a spontaneous switchable electric dipole moment. In the absence of an externally applied electric field, the electric polarization, corresponding to the dipole moment, can have two or more orientations and can be shifted from one orientation, or state, to another by the external application of an electric field.

By analogy, a crystal is said to be ferroelastic if it exhibits a spontaneous switchable mechanical strain. In the absence of an externally applied mechanical stress, the mechanical strain can have two or more configurations, and can be shifted from one configuration to another by external application of a mechanical stress. In a limited class of materials, the two effects, ferroelectricity and ferroelasticity, are coupled so that the two or more stable states of the crystal are possible, each characterized by a definite orientation of electric polarization and a definite mechanical strain configuration.

The terms "ferroelectric" and "ferroelastic" arise by analogy with ferromagnetism. Like ferromagnetic materials, ferroelectric crystals exhibit a hysteresis loop, except that the loop occurs on a plot of electric polarization versus electric field, and display a transistion temperature, $T_c$, analogous to the ferromagnetic Curie temperature, above which the spontaneous dipole moment, and indeed ferroelectric behavior, disappear. Likewise, ferroelastic materials display a hysteresis loop on a plot of mechanical stress versus mechanical strain, and a transition temperature. When ferroelectricity and ferroelasticity are coupled in a single material, a hysteresis loop is displayed on a plot of electric polarization and associated mechanical strain versus electric field and associated mechanical stress, and both spontaneous polarization and spontaneous strain disappear at the same critical temperature. Such a material can be switched among states, each characterized by a specific electric polarization and mechanical strain, by external application of either an electric field or a mechanical stress, or both.

The region, within a single ferroelectric crystal, in which the spontaneous polarization vector is everywhere oriented in the same direction, is called a domain. There is, generally, more than one domain within a crystal, and the interface between domains is called a domain wall. Application of an electric field having a component in an allowed direction of polarization can cause nucleation of and/or growth of ferroelectric domains having that particular polarization direction, with consequent formation and movement of the associated domain walls. The analogous situation exists in ferroelastic materials, where the domain wall is effectively a twin boundary. In coupled ferroelectric/ferroelastic materials, each ferroelectric domain is associated and coextensive with a ferroelastic domain, and the size and location of a particular domain (and thus the position and motion of a domain wall) can be controlled by either electrical or mechanical means, or by both means simultaneously.

The existence of ferroelasticity and ferroelectricity can be ascertained from the point symmetry of the crystal below above the transition temperature which is the Curie temperature, as shown by Aizu, J. Phys. Soc. Japan 27, 387 (1969). The possible types can be classified using the convenient notation of Aizu wherein the point group of the high temperature, prototype paraelectric and/or paraelastic phase, is first written followed by F and the point group of the ferroelastic and/or ferroelectric phase. The possible domain walls in such materials can be ascertained by the use of group theory, following the method which Shuvalov [J. Phys. Soc. Japan 28 Supplement 39 L970] has developed for ferroelectric materials.

The domain walls which interface adjacent domains tend to be highly planar and generally extend completely across the crystal in crystalline materials which have ferroelastic properties. The domain walls differ in optical properties from either adjacent domain and in particular if collimated light is passed through a crystal of a ferroelastic material containing a domain wall, the light emerging from the region of the domain wall diverges, and can be isolated by spatial filtering techniques.

When a ferroelastic crystal containing a domain wall extending across the crystal is switched from one strain state to the state of the adjacent domain interfaced by the wall, the switching is accomplished by lateral motion of the domain wall. Thus by providing switching means together with spatial filtering a line image of the domain wall can be scanned in a controlled manner to form a useful line scanner as shown in U.S. Pat No. 3,704,937.

The above method of obtaining a line scanner is not highly efficient since only the light traversing the region of the domain wall is utilized. It would be desirable to obtain higher intensity scannable line scanners for use in many applications.

SUMMARY OF THE INVENTION

The present invention is a laser with scannable output having an off-axis optical resonant cavity containing a lasing medium, the cavity consisting of a first mirror, a second mirror adjacent the first mirror and a third mirror spaced from the first and second mirrors. The first mirror has a reflective coating on the face of a crystal with ferroelastic properties, the crystal being divided into two domains by a domain wall intersecting the face having the reflective coating to form a concave rooftop mirror. Means are provided to substantially focus the light in the cavity on the domain wall. The wall can be moved in the crystal preferably to and from the axis of the system by means utilizing the ferroelastic properties, or other properties of the crystal such as ferroelectricity coupled with the ferroelastic properties, so that the light resonant in the cavity follows the movement of the domain wall. One of the first and second mirrors is partially transparent to extract light from the cavity, which can then be focused to a scannable image.

THE DRAWINGS AND DETAILED DESCRIPTION OF THE INVENTION

This invention will be better understood by reference to the drawings which accompany this specification. In the drawings.

Figure 1:
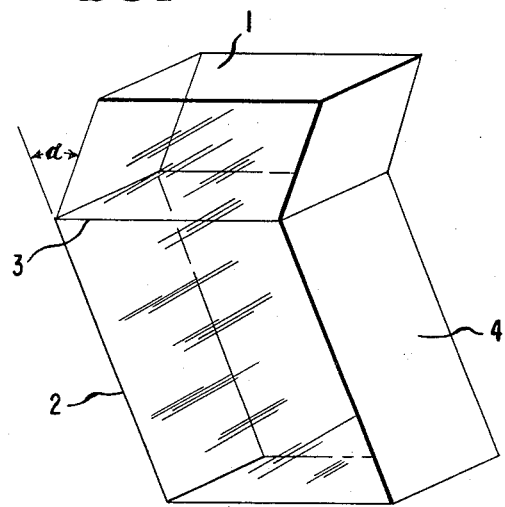
FIG. 1 shows a crystal of a material having ferroelastic properties divided into two domains by a domain wall and having a reflective coating to form a "rooftop" mirror.

Turning now to FIG. 1, in that figure is shown a crystal of a material having ferroelastic properties divided into two domains 1 and 2 by a domain wall 3. Due to the ferroelastic properties, the domain wall 3 is highly planar. Further, since by definition between states of different spontaneous strain a deformation in at least one plane of the crystal intersected by the domain wall occurs, indicated by the angle $\alpha$ in FIG. 1. As an example the coupled ferroelastic-ferroelectric crystals of the rare earth phosphates having the $\beta'$-gadolinium molybdate structure have domain walls in the {110} set of planes, intersecting the $a$ and $b$ planes of the orthorhombic ferroelectric structures. Since the $a$ and $b$ axes (both derived from the a axes of the tetragonal paraelastic phases above the 159°C transition temperature) differ slightly, the (110) planes intersecting the domain wall "bend" at an angle of 0.28° at the domain wall for gadolinium molybdate. Somewhat different values are obtained for the other rare earth molybdates. If FIG. 1 is thus considered to represent a crystal of gadolinium molybdate cut with faces in the (001) plane and edges in the {110} set of planes, an edge intersected by a domain wall will form a concave "rooftop" configuration. Such a crystal having a thin reflecting surface such as a vacuum-deposited gold layer 4 is employed as one mirror in the laser device of the present invention. The spontaneous polarization is oriented in two <001> directions in adjacent domains. By depositing electrodes on the opposing (001) faces of the crystal, insulated from the reflecting face by a gap, generally of not more than 0.15 mils, from the reflecting edge, and by applying an electric field between the electrodes, the domain wall will move laterally through the crystal. The domain wall can also be moved by mechanical stress applied as a shear stress along the <110> direction parallel to the domain wall.

Figure 2:
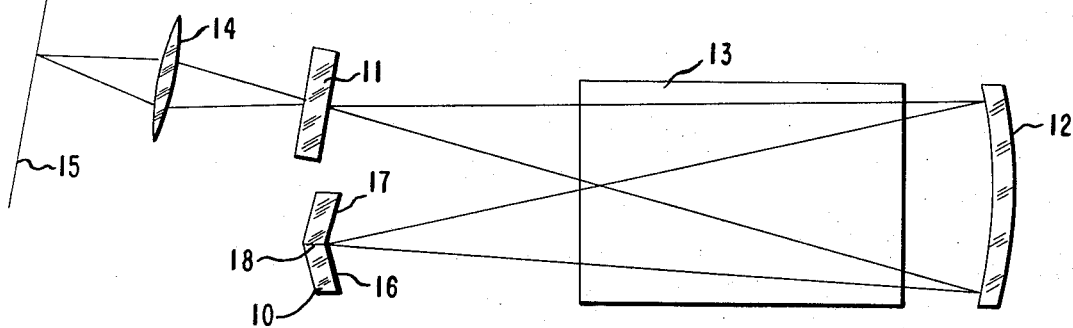
FIG. 2 shows one embodiment of a scannable laser according to the present invention.

FIG. 2 illustrates the use of such a reflective element to obtain a scanning laser source. An optical resonant cavity is formed by the three mirrors 10, 11 and 12. Mirror 10 is formed by the reflection coated edge of a crystal having ferroelastic properties such as gadolinium molybdate which is intersected by a domain wall to form a concave rooftop. The crystal is oriented so that the line formed by the intersection of the domain wall with the reflecting face moves towards and away from the axis of the system. Thus on moving the domain wall, the line of intersection with the reflecting face will move towards and away from the axis of the system. Mirror 11 is a partially reflecting plane mirror to enable coherent light to be extracted from the system. The third mirror, 12, is a concave mirror of relatively long focal length disposed so that the surface of mirrors 10 and 11 are in image-object relationship. A superradiant medium, 13, e.g., mercury ion excited by a hollow cathode discharge, is placed within the optical cavity. Light exiting the cavity through mirror 11 is imaged by lens 14 onto a screen or other recording device 15.

The device can operate to produce a scanning line image in one of two ways. The first method can be termed a modepulling method, which depends on the fact that the gain in a laser is greater near the axis of the optical cavity, and accordingly modes are preferentially excited as close to the axis as possible. Mirror 10 of FIG. 2 can be considered to be two plane mirrors 16 and 17 oriented at a slight angle to each other and meeting at the domain wall 18 or mirror 10. If mirror 16 is aligned so that light can resonate between mirrors 16, 12 and 11, mirror 17 will be misaligned. The assembly will then operate as a mode-selective laser where a mode will be trapped on mirror 16 adjacent domain wall 18, the conjugate mode being on mirror 11. The mode will follow the domain wall 18 as it is driven back and forth across the crystal plate by means described hereinafter.

The mode itself can be extracted through mirror 10 provided the reflective coating on the mirror is partially transmitting. Alternatively, as shown in FIG. 2, mirror 11 can be made partially transmitting and the conjugate mode thereby extracted from the cavity as shown in FIG. 2 and imaged by lens 14 onto an image plane 15.

If the domain wall 18 in the mirror 10, constructed from a material having ferroelastic properties is oscillated slowly back and forth while the cavity is aligned it is possible to find conditions under which rooftop reflection takes place at the domain wall and the rooftop modes predominate and follow the movement of the domain wall. In this method of operation, which is preferred, both mirror 16 and 17 are symmetrically misaligned with the cavity, and lasing action takes place off the domain wall region itself. Optimum adjustment of the cavity length produces a sharp, scanning line. Moving crystal 10 toward mirror 12 or away from mirror 12 broadens the output line. Using a cavity with a length of about 1 meter and an $Hg^+$ ion superradiant medium excited in a hollow cathode discharge, as much as 10 percent of the total power available from the laser was obtained in the scannable output.

Figure 3:
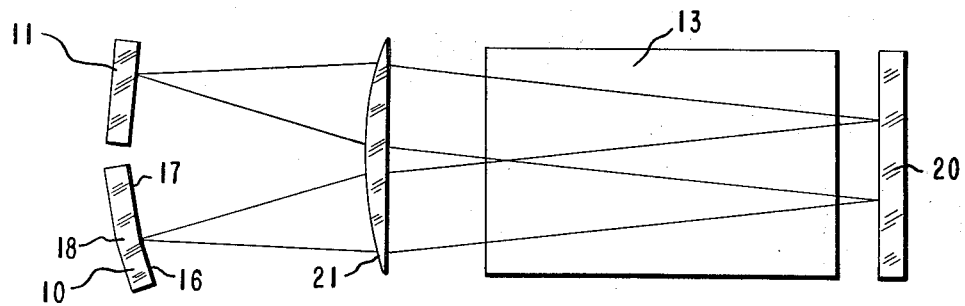
FIG. 3 shows another configuration of a laser cavity which can be employed in the present invention.

The above method of making the optical resonant cavity is not unique, and many variations will occur to one skilled in the art. FIG. 3 shows one alternate method of constructing the cavity when mirror 12 of FIG. 2 is replaced with a plane mirror 20 and a lens 21 is provided between the lasing medium 12 and mirrors 10 and 11, to bring the light in the cavity to a focus at mirrors 10 and 11.

While it is desirable to focus the light with respect to a direction perpendicular to the wall, defocusing with respect to the length of the domain wall is beneficial in many instances. Lens 21 can be in the form of a cylindrical lens or a combination of cylindrical lenses to achieve this objective. Likewise in FIG. 2 the mirror 12 can be figured asymmetrically or combined with a cylindrical lens to achieve an equivalent result.

The arrangement of FIG. 3 has the advantage that a greater volume of the lasing medium is traversed by the light in the cavity, compared with the arrangement in FIG. 2. This advantage is offset by the presence of the refracting surfaces of lens 21 which introduce reflection losses.

To provide a line scanner it is necessary to provide means to move the domain wall in the above described devices. With coupled ferroelectric-ferroelastic materials such as gadolinium molybdate, this can be achieved by providing electrodes on the (001) faces of the crystal, i.e., on faces intersecting the ferroelectric axis, and applying an electric field to the electrodes.

Figure 4A:
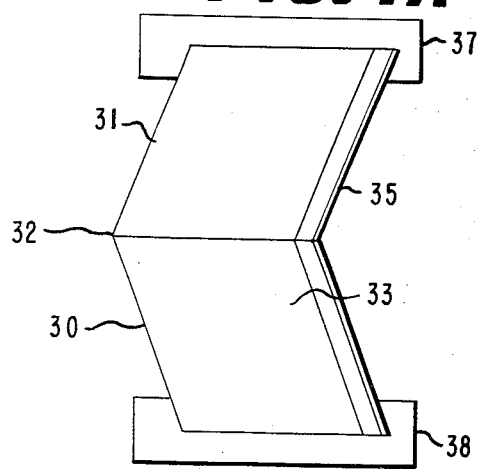
FIGS. 4a and 4b illustrate a method of moving a domain wall in a crystal of a material having coupled ferroelectric/ferroelastic properties using electrical stress.
Figure 4B:
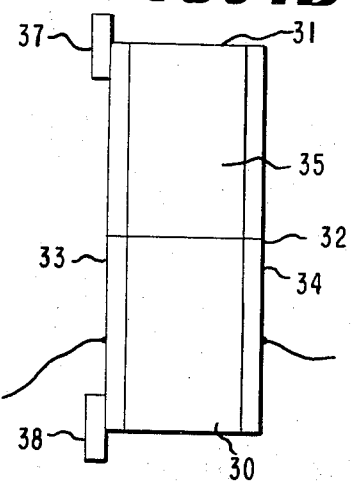

In practical applications, it is desirable to maintain a single domain wall trapped within a switching region of the crystal which region should be as large as the aperture of the system. FIG. 4a and FIG. 4b illustrate a method of electroding a ferroelectric/ferroelastic crystal and of applying clamps to retain a domain wall within a predetermined region. In FIG. 4a is shown a c-cut gadolinium molybdate crystal with edges cut parallel to the {110} set of planes divided into domains 30 and 31 by a domain wall 32. As described hereinabove, the crystal "bends" at the domain wall. The crystal is electroded with electrically conducting electrodes 33 and 34 on the (001) faces thereof as shown in FIG. 4b which shows a side view of the assembly. The crystal also has a reflective coating 35 on the concave (110) face intersected by the domain wall 32. If the reflective coating is conducting, it must be isolated from the driving electrodes 33 and 34 by a short insulating gap. This can be achieved by removing a small strip of the electrode with an electron beam or by lapping the edges after the electrodes have been deposited. Rounded, smooth edges also assist in preventing chipping or spalling when the domain wall is driven back and forth. Plates 37 and 38 of a rigid material such as glass are cemented to the crystal. The plates have straight edges aligned parallel to the domain wall 32. A liquid, hardenable, cement which does not shrink on hardening should be employed to cement the assembly together. α-Cyanoacrylate cements are suitable for this purpose. Preferably the clamps are placed on the crystal and carefully aligned with the edges parallel to the preexisting domain wall and then the liquid cement is allowed to flow between each clamp and the crystal by capilliary attraction. The cement is then hardened.

The use of mechanical stress in addition to electrical stress offers several advantages. Electrical stress is applied parallel to the polarization axis and can favor the formation of more than one domain wall direction. By contrast, mechanical stress can be directed to favor only a single domain wall orientation, and thus acts not only to drive the domain walls but to inhibit the formation of domain walls having undesired orientation.

With materials having ferroelectric as well as ferroelastic properties, it is necessary to transfer charge from one surface of the plate to the other. Accordingly, in such cases mechanical switching should be employed with electroded crystals and means to transfer charge between the electrodes.

The simplest means to transfer charge is to short-circuit the electrodes. In that event, the movement of the domain wall in the switching region is determined by the mechanical stress applied. For a given mechanical pressure, the rate of movement of the domain wall decreases with increasing electrical resistance between the electroded faces. Accordingly, switched fixed resistors or a variable resistor between the electrodes can be employed to control the rate of wall travel.

Instead of passive circuitry between the electrodes as described hereinabove, it is also possible to use elements such as constant or variable voltage sources to add to, or subtract from effects of the mechanical stress.

Figure 5:
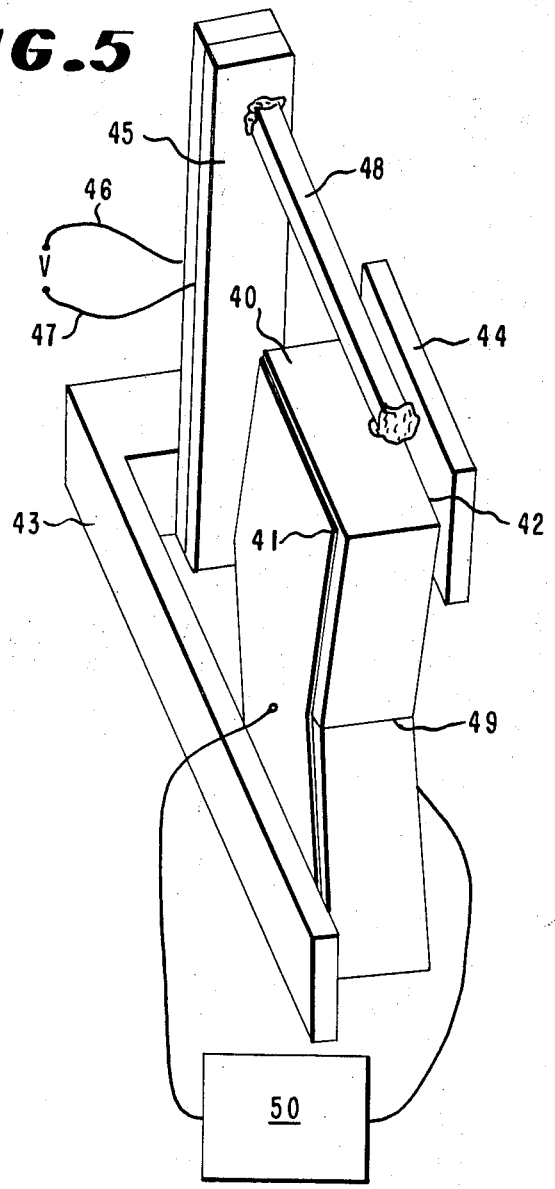
FIG. 5 shows a method of driving a domain wall in a ferroelastic material using mechanical stress.

FIG. 5 illustrates means to drive a domain wall in a material having ferroelastic properties. A crystal such as a c-cut crystal of gadolinium molybdate 40, which is fully electroded with electrodes 41, 42 on the faces of the plate is cemented to a supporting clamp 42 and a movable clamp 44. The clamps are so applied that the switching region contains a single domain wall 49 parallel to the straight edges of the clamps 43 and 44. The mechanical stress is supplied by a bender bimorph element 45 composed of two piezoelectric ceramic strips, which are oriented, electroded and joined together. Such devices are well known as mechanical-electrical transducers, e.g., in ceramic phonograph cartridges. On application of a voltage V across leads 46 and 47 attached to the electroded faces of the bender bimorph, the element bends. Generally, a voltage of 100–200 v. is sufficient to drive the device which is capable of high frequency response. The end of the bender bimorph 45 opposite the supporting clamp 43 is attached to a drive rod 48. The other end of rod 48 is cemented with epoxy cement to the edge of the crystal plate 40. Thus on application of a voltage V force is applied to the crystal plate directed parallel to the domain wall 49. Active or passive means 50 to control the flow of charge between electrodes 41 and 42, as described hereinabove are provided.

The method of mechanical driving can be applied to pure ferroelastic materials, i.e., crystalline materials which exhibit ferroelectricity but not ferroelasticity, in which case the electrodes and associated circuitry can be omitted.

Recently it has been discovered that lead phosphate is a pure ferroelastic material which has suitable optical properties for use in the present invention.

The structure of the paraelastic and ferroelastic phases of α-lead phosphate has been investigated by Keppler, Z. fur Krist. 132 228–235 (1970) who found the high temperature form had symmetry $\bar{3}m$ above the transition temperature of 170°C with unit cell dimension $c = 20.30 \pm 0.05A$, and $a = 5.53 \pm 0.02$ for the hexagonal unit cell. Below 179°C the material is monoclinic with space group 2/m and unit cell dimensions at 25°C of $a = 13.816 \pm 0.035A$, $b = 5.692 \pm 0.015A$, $c = 9.429 \pm 0.024A$ and $\beta = 102.36° \pm 0.05°C$. The material is thus classified as $\bar{3}mF2/m$ in the Aizu notation and three types of domains should exist corresponding to the strain transforming the trigonal to the monoclinic form occurring in one of the three equivalent mirror planes of the trigonal phase. Each pair of domains can interface at two mutually perpendicular walls and thus a total of 6 possible wall orientations are possible.

α-Lead phosphate is transparent from $5\mu$ to $0.28\mu$, i.e., the whole visible spectrum. The crystals cleave readily along the b-c plane corresponding to the c-plane of the hexagonal unit cell. The domains are biaxially birefringent with $\Delta n = 7 \times 10^{-5}$ (optically negative). The optic axes lie in the a-c mirror plane of the monoclinic unit cell. The high temperature form is uniaxially birefringent and isotropic along the c axis.

The six domain walls can be classified into two sets, one set of three n-walls and one set of three t-walls. The $n$-walls are essentially perpendicular to the $b$-$c$ plane of cleavage and lie at 60° to the $a$-$c$ mirror plane and hence the plane of the optic axis. The crystals "bend" in the $b$-$c$ plane by an angle of 1.6° at an $n$-wall and also "bend" about 4.4° perpendicular to the wall and the $b$-$c$ plane. The $t$-walls lie at 30° to the $a$-$c$ mirror plane and tilted at an angle of 73° to the $b$-$c$ plane. The "bend" perpendicular to the wall and the $b$-$c$ plane is about 4.6°, but no bending in the $b$-$c$ plane is observed.

Either an $n$ wall or a $t$ wall can be employed in the practice of the present invention. The $n$ walls behave as described hereinabove for the domain walls of gadolinium molybdate. The $t$ walls can be employed with the $b$-$c$ plane of the crystal perpenperpendicular to the optic axis of the laser cavity.

Both $n$ walls and $t$ walls can be moved in a plate using mechanical drive as shown in FIG. 5, except that, since $\alpha$-lead phosphate is a pure ferroelastic, the electrodes, and means to transfer charge between the electrodes, can be omitted.

Since the number of possible domain walls are greater, there is a greater possibility for nucleating and propagating domain walls of unwanted orientation with lead phosphate. Clamping should be employed, as in FIG. 4$a$, 4$b$, and 5 and great care should be taken to align the mechanical drive so that the stress is parallel to the desired domain wall.

Some difficulty may be encountered in obtaining $\alpha$-lead phosphate single crystals wherein the domain walls can be moved by simple mechanical pressure to obtain a sample with a single domain wall. In most cases a number of differing wall orientations are obtained which interlock. On application of stress the walls will not move and the crystal may shatter.

Such crystals can be brought to a state in which substantially all of the walls are in a single direction, and the crystal can thereafter be converted to the desired state where only a single domain wall is present by simple mechanical stress.

One method of poling crystals of lead phosphate is described in copending, commonly assigned patent application U.S. Ser. No. 301,540. The method uses a hot stage having a uniform temperature gradient preferably not more than 10°C/cm. and having the isothermal at the Curie temperature near the center of the stage. The crystal plate is placed in the cool end of the stage then manipulated so that only a region containing domain walls of selected orientation remains below the Curie temperature, the domain walls running at a substantial angle, greater than 45°, to the Curie point isothermal. The crystal is then cooled either by reducing current to the hot stage or by moving the crystal so that the Curie point isothermal sweeps through the crystal in a direction perpendicular to its length. The domain walls extend behind the Curie point isothermal to cover the crystal. The poling of the crystal can then be accomplished by mechanical stress.

Another method of poling a ferroelastic crystal is to apply stress directed along a selected domain wall direction while cooling the crystal through the Curie temperature. A relatively small stress is tried first and the process repeated with increased stress if needed. The crystal is thus obtained with domain walls in a single direction and can be poled by mechanical stress.

Since obvious modifications and equivalents in the invention will be evident to those skilled in the arts, I propose to be bound solely by the appended claims.

The specific embodiments of the invention in which an exclusive property or privilege is claimed are defined as follows:

1. A scanning laser comprising
    an off-axis resonant cavity containing a lasing medium comprising a first mirror and a second mirror adjacent said first mirror and a third mirror spaced from said first and said second mirrors, said first mirror consisting of a substrate crystal of a material having ferroelastic properties having a reflective coating on one face thereof, said crystal being divided into two domains by a domain wall, said domain wall intersecting the face of said crystal having the reflective coating, whereby said face is bent concavely at the intersection of said domain wall;

and having one of said first and said second mirrors partially reflective;
    means to focus the light on said coating at the said domain wall of said first mirror;
    means to move the said domain wall in said crystal whereby the light resonant in said cavity follows the domain wall; and
    means to focus the light emerging from said cavity to an image.

2. Apparatus of claim 1 wherein said first mirror is a crystal of a rare earth molybdate having the $\beta'$-gadolinium molybdate structure having a domain wall intersecting a (110) face, and having a reflective coating on said face.

3. Apparatus of claim 2 wherein said crystal is $\beta'$-gadolinium molybdate.

4. Apparatus of claim 1 wherein said crystal is $\alpha$-lead phosphate.

* * * * *